Patented Feb. 9, 1937

2,070,080

UNITED STATES PATENT OFFICE 2,070,080

GERMICIDAL PREPARATION

Merrill C. Hart, Kalamazoo, Mich., assignor to The Upjohn Company, Kalamazoo, Mich.

No Drawing. Application December 31, 1934, Serial No. 760,042

4 Claims. (Cl. 167—71)

My invention relates to improvements in germicidal preparations and more particularly to mercury compounds used as germicidal preparations and has to do with combining such mercurials with alkylated phenols either with or without an added dye.

Most of the germicidal mercury preparations as used commercially are germicidal if used in strong concentrations, but are not germicidal at the concentrations ordinarily used. Throughout this application, when referring to germicidal or bacteriostatic properties of these mercury compounds, I am referring to those terms in the sense in which they are used in the above references. I have found however, that if the ordinary mercury preparations used as germicides are combined even in bacteriostatic concentrations with other germicidal preparations, that a synergistic action takes place and that the germicidal efficiency of the mixture is greatly increased beyond the arithmetical mean of the separate germicidal powers of the components.

This applies when alkylated phenols are employed in combination with the so-called germicidal mercury compounds.

I have also found that the use of dyes in connection with such a mixture is of great efficacy. The solutions thus colored are valuable in enabling physicians using a germicide to delineate the area to be disinfected, although colorless solutions may be used effectively for treating the eye, ear or nose, for example by irrigation.

The objects of this invention are:

First, to produce a new and improved germicidal preparation.

Second, to produce such a preparation in which a so-called germicidal mercury compound is combined with a different germicidal compound to produce a compound having a greater efficacy than either of the combined compounds.

Third, to provide such a compound resulting from the combination of a so-called mercurial germicide and an alkylated phenol.

Fourth, to provide such a compound which is a mixture of one or more of the so-called germicidal mercury compounds with an alkylated cresol, specifically an amyl cresol.

Fifth, to provide such a germicidal compound including a dye.

Further objects and advantages of my invention will appear from the description to follow. The invention is pointed out in the claims.

In accordance with my invention, I may form a germicidal preparation containing orthohydroxyphenylmercuric chloride and an amyl cresol or a mixture of amyl cresols resulting from the condensation with amyl alcohol of U. S. P. cresol, which is a mixture of ortho, meta and para cresols, to which I may or may not add a dye such as basic fuchsine or orange G.

When a solution of orthohydroxyphenylmercuric chloride which is structurally

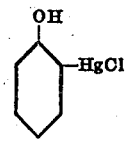

is tested by the standard F. D. A. method at 37 degrees C. using Staphylococcus aureus, I find that the mercurial preparation is germicidal at a dilution of 1–1000 but that it is not germicidal at dilutions of 1–2000 or greater. Ordinarily orthohydroxyphenylmercuric chloride is used at dilutions of greater than 1–2000. Using the same tests, secondary amyl tri-cresol, which is the condensation product of the condensation of U. S. P. cresol with a secondary amyl alcohol is germicidal in five minutes at a dilution of 1–6500.

If a solution is made up containing one part of orthohydroxyphenylmercuric chloride and one part of an alkylated cresol, namely, secondary amyl tricresol to 1000 parts of solvent, the germicidal potency is much higher than would be expected, that is to say, the solution can be diluted fifteen times without becoming non-germicidal. In making such a solution the best figured strength would be that a dilution of over 7½ times would destroy the efficacy as a germicide, but my tests show that when the two substances are present as indicated, the solution is germicidal at concentrations of 1–15,000, which is a doubling of the germicidal efficacy of anything that would be expected. I have obtained these results testing in exactly the same manner and using the same organism, Staphylococcus aureus, for the same length of time as above stated.

I have found further that the efficiency of the solution of orthohydroxyphenylmercuric chloride and alkylated cresol is a true example of synergistic action, because it is possible to lower the concentration of the mercurial to 1–10,000 with approximately the same germicidal effect as above stated where the concentration of the mercurial is ten times as great.

It will be fully appreciated that this is of great practical importance because it enables one to employ a mixture of alkylated cresol with substantially non-toxic amounts of the mercurial which secures a higher effective pharmaceutical preparation with far less danger than would be attendant on the use of mercurials in more concentrated solutions.

In addition to the specific action on *Staphylococcus aureas*, I have discovered that the solution of these two substances is more general and less specific in its germicidal efficiency. The amyl tricresol tested under the same F. D. A. method using bacillus coli was found to be ineffective at dilutions below 1-6000. The addition of an amount of orthohydroxyphenylmercuric chloride equal to the amount of amyl tricresol present increased the efficacy of the solution, making it germicidal at concentrations of 1-13,333.

I have found further that the use of my improved germicide is of extreme value in the application of wet dressings to open wounds in proper dilution. In such cases the real germicidal power of the mercury itself is greatly increased as the time of the application lengthens, thus while in skin sterilization, which is often of comparatively short duration, the effectiveness of my germicide resides in the presence of alkylated phenol and its elevated germicidal power. After six to twelve hours, the mercurial itself develops a very considerable germicidal potency of its own. With my improved germicide, it is possible to obtain both the immediate rapid disinfecting effect and the later germicidal effect of the mercurial, making possible the use of a low and substantially non-irritating concentration of the alkylated phenol because of the later greatly augmented efficacy of the mercurial, allowing for a lower toxicity in the combination than would be possible with either germicide alone.

I have investigated other mercurials and find that similar results are obtained. In place of the orthohydroxyphenylmercuric chloride, I can use nitro-hydroxymercuri-ortho cresol, ortho-hydroxyphenylmercuric hydroxide, ethylmercurisalicylic acid, and phenylmercuric-nitrate.

The various mercurial substances above discussed fall generally into the formula R—Hg—X in which R may be phenyl, substituted phenyl, phenoxy, or substituted phenoxy, and in which X may be an acidic group or a hydroxyl group or an alkyl group or an anhydro-structure, which might be stated in another way, namely, the general formula being R—Hg—X, in which R is phenyl or substituted phenyl and in which, if the mercury is substituted directly in the ring, X may be an acidic group or a hydroxyl group or an anhydro structure, or in which, if the mercury is connected to R through oxygen. X is an alkyl group. Contained within this general formula is the general formula R—O—Hg—X, in which R is phenyl or substituted phenyl and X may be an alkyl group.

I have found that in place of the alkylated tricresol any cresol added to any of the above mercurials produces the same synergistic effect and I have found that in place of cresols or alkylated cresols any germicide phenolic compound, such as phenol or an alkylated phenol, may be employed, the monohydric phenols being especially adapted to produce the synergistic action.

I have also found that chlorinated substituted phenols, such as chlorthymol, may be similarly potentiated by the synergistic effect produced by combining it with relatively smaller amounts of mercurials.

As specific examples of the above simple U. S. P. tricresol to which a compound having the general formula R—Hg—X above was added, showed a positive germicidal effect of 1-5000 while the tricresol itself has a very low order of efficiency, e. x. 1-240.

Chlorthymol showed a 200% increase in germicidal power when combined with phenylmercuric nitrate. Amyltricresol with ethyl mercurisalicylic acid and with various other mercurated nitrocresols gave this same evidence of synergistic action and increased germicidal efficiency when mixed.

The combinations made in accordance with my invention may be dissolved in alcohol of various dilutions suitable to the solubility of the components used or they may be incorporated in an aqueous vehicle using the various suitable alkaline agents such as sodium carbonate, sodium ricinoleate or other sodium salts of the fatty acids, both with or without glycerin.

It will be appreciated that the proportions of the materials will depend somewhat upon the bacteriological findings in each specific case. I have found that in a solution containing 1-1000 of the phenol combined with 1-5000 to 1-10,000 of orthohydroxyphenylmercuric chloride is a highly acceptable and a commercial germicidal preparation. In this instance the peculiar enhancement of the germicidal efficacy has been obtained with a minimum of the mercurial and hence is a solution of very low toxicity.

I have found that the phenols most suitable for my use are alkylated cresols in which the carbon atoms of the alkyl group range from 1 to 7. These specific germicides are more general than those having a higher number of carbon atoms and are therefore more suitable for a general purpose germicide. I have found that the most satisfactory for all purposes is amyltricresol which is amylated U. S. P. cresol which is a combination of ortho, meta and para cresols.

Having thus described my invention, what I claim as new and desire to secure by Letters Patent is:

1. A germicidal preparation comprising orthohydroxyphenylmercuric chloride in such concentration that alone it would be merely bacteriostatic, and an alkylated cresol.

2. A germicidal preparation comprising orthohydroxyphenylmercuric chloride and an alkylated cresol.

3. A germicidal preparation comprising orthohydroxyphenylmercuric chloride in such concentration that alone it would be merely bacteriostatic, and an amyl cresol.

4. A germicidal preparation comprising orthohydroxyphenylmercuric chloride in such concentration that alone it would be merely bacteriostatic, and a germicidal phenolic compound.

MERRILL C. HART.